(12) United States Patent
Suzuki (10) Patent No.: US 11,400,768 B2
(45) Date of Patent: Aug. 2, 2022

(54) PNEUMATIC TIRE (71) Applicant: The Yokohama Rubber Co., LTD., Tokyo (JP)

(72) Inventor: Takayuki Suzuki, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 16/065,015

(22) PCT Filed: Dec. 22, 2016

(86) PCT No.: PCT/JP2016/088536
§ 371 (c)(1),
(2) Date: Jun. 21, 2018

(87) PCT Pub. No.: WO2017/111114
PCT Pub. Date: Jun. 29, 2017

(65) Prior Publication Data
US 2019/0016181 A1 Jan. 17, 2019

(30) Foreign Application Priority Data
Dec. 25, 2015 (JP) .............................. JP2015-255262

(51) Int. Cl.
*B60C 15/00* (2006.01)
*B60C 15/06* (2006.01)
(Continued)

(52) U.S. Cl.
CPC ...... *B60C 15/0653* (2013.01); *B60C 15/0072* (2013.01); *B60C 15/024* (2013.01);
(Continued)

(58) Field of Classification Search
CPC ........ B60C 15/00; B60C 15/02; B60C 15/024
See application file for complete search history.

(56) References Cited

U.S. PATENT DOCUMENTS 4,998,575 A * 3/1991 Kanamaru .............. B60C 15/04
152/540
5,232,032 A * 8/1993 Diernaz ................ B60C 15/024
152/379.4
(Continued)

FOREIGN PATENT DOCUMENTS

EP 531007 * 3/1993
JP 8-150813 * 7/1996
(Continued)

OTHER PUBLICATIONS

Machine translation of JP 2005-193750, 2005.*
(Continued)

*Primary Examiner* — Justin R Fischer
(74) *Attorney, Agent, or Firm* — Thorpe North & Western (57) ABSTRACT A pneumatic tire mountable on a 15° tapered specified rim, the pneumatic tire including a bead portion, bead core, a carcass, a steel cord reinforcing layer, and a bead rubber layer. A distance from a second line segment to a third line segment is from 4 mm to 8 mm, and a ratio R2/R1 is from 0.935 to 0.975, wherein R2 is a tire radius at a bead toe of a bead base portion and R1 is a tire radius at a bead heel.

1 Claim, 6 Drawing Sheets (51) Int. Cl.
*B60C 15/024* (2006.01)
*B60C 15/04* (2006.01)
*B60C 9/02* (2006.01)
*B60C 15/05* (2006.01)

(52) U.S. Cl.
CPC ........ *B60C 15/0635* (2013.01); *B60C 9/0292* (2013.01); *B60C 15/04* (2013.01); *B60C 15/05* (2013.01); *B60C 2015/066* (2013.01); *B60C 2200/06* (2013.01)

(56) References Cited

U.S. PATENT DOCUMENTS

2010/0224300 A1    9/2010  Maruoka
2012/0298278 A1* 11/2012  Wright ..................... B60C 9/08
                                                    152/552

FOREIGN PATENT DOCUMENTS

| JP | 2855327 | | 2/1999 |
| JP | 2002-254908 | | 9/2002 |
| JP | 2005-193750 | * | 7/2005 |
| JP | 2005-329796 | | 12/2005 |
| JP | 2010-228746 | | 10/2010 |

OTHER PUBLICATIONS

Machine translation of JP 8-150813, 1996.*
International Search Report for International Application No. PCT/JP2016/088536 dated Apr. 4, 2017, 4 pages, Japan.

* cited by examiner

| | CONVENTIONAL EXAMPLE | COMPARATIVE EXAMPLE 1 | COMPARATIVE EXAMPLE 2 | COMPARATIVE EXAMPLE 3 | COMPARATIVE EXAMPLE 4 | EXAMPLE 1 | EXAMPLE 2 | EXAMPLE 3 | EXAMPLE 4 |
|---|---|---|---|---|---|---|---|---|---|
| DISTANCE A (mm) | 1 | 3 | 9 | 6 | 6 | 4 | 8 | 6 | 6 |
| R2/R1 | 0.93 | 0.95 | 0.95 | 0.93 | 0.98 | 0.95 | 0.95 | 0.935 | 0.975 |
| ECCENTRIC ENGAGEMENT | 3.5 | 3 | 3 | 3 | 3.5 | 2.5 | 2.5 | 2 | 2.5 |
| RIM MOUNTING WORKABILITY | 90 | 100 | 100 | 90 | 100 | 100 | 100 | 100 | 100 |

FIG. 5

|  | EXAMPLE 5 | EXAMPLE 6 | EXAMPLE 7 | EXAMPLE 8 |
|---|---|---|---|---|
| DISTANCE A (mm) | 6 | 6 | 6 | 6 |
| R2/R1 | 0.95 | 0.95 | 0.95 | 0.95 |
| R1/R3 | 0.983 | 0.985 | 0.995 | 0.998 |
| ECCENTRIC ENGAGEMENT | 2 | 1.5 | 1.5 | 1.5 |
| RIM MOUNTING WORKABILITY | 100 | 100 | 100 | 95 |

FIG. 6

|  | EXAMPLE 9 | EXAMPLE 10 | EXAMPLE 11 | EXAMPLE 12 |
|---|---|---|---|---|
| DISTANCE A (mm) | 6 | 6 | 6 | 6 |
| R2/R1 | 0.95 | 0.95 | 0.95 | 0.95 |
| R1/R3 | 0.99 | 0.99 | 0.99 | 0.99 |
| $\theta_1$ | 17 | 18 | 23 | 24 |
| $\theta_2$ | 26 | 27 | 33 | 34 |
| ECCENTRIC ENGAGEMENT | 1.5 | 1 | 1 | 1 |
| RIM MOUNTING WORKABILITY | 100 | 100 | 100 | 95 |

FIG. 7

|  | EXAMPLE 13 | EXAMPLE 14 | EXAMPLE 15 | EXAMPLE 16 |
| --- | --- | --- | --- | --- |
| DISTANCE A (mm) | 6 | 6 | 6 | 6 |
| R2/R1 | 0.95 | 0.95 | 0.95 | 0.95 |
| R1/R3 | 0.99 | 0.99 | 0.99 | 0.99 |
| θ | 14 | 15 | 20 | 21 |
| ECCENTRIC ENGAGEMENT | 1.5 | 1 | 1 | 1 |
| RIM MOUNTING WORKABILITY | 100 | 100 | 100 | 95 |

FIG. 8

PNEUMATIC TIRE

TECHNICAL FIELD

The present technology relates to a pneumatic tire.

BACKGROUND ART

A pneumatic tire includes a bead portion with a bead core on either side in the tire lateral direction. A pneumatic tire is mounted on a rim wheel by the bead portion and the rim wheel engaging. Japan Patent No. 2855327 describes technology designed to improve the durability of a bead portion via a specific relationship between a bead core (bead wire) and a bead base portion.

In a pneumatic tire, when a bead portion is not engaged with a rim wheel with correct positioning and is eccentrically engaged, uneven wear can occur. In particular, in use conditions with a low wear rate such as long hauls (long-distance transport), the likelihood of uneven wear occurring in an eccentrically engaged pneumatic tire is significant.

SUMMARY

The present technology provides a pneumatic tire that can suppress eccentric engagement of a bead portion on a rim wheel.

A pneumatic tire according to an embodiment of the present technology is a pneumatic tire mountable on a 15° tapered specified rim, the pneumatic tire including:

a pair of bead portions disposed on either side of a tire equatorial plane in a tire lateral direction;

a bead core provided in each of the pair of bead portions;

a carcass supported by the pair of bead cores, the carcass including a carcass body portion and a carcass folded back portion formed by the carcass folding back at the bead core;

a steel cord reinforcing layer disposed on an outer surface of the carcass folded back at the bead core; and a bead rubber layer with at least a portion thereof disposed between the carcass body portion and the carcass folded back portion;

when the pneumatic tire is not mounted on the specified rim, a distance from a second line segment to a third line segment being from 4 mm to 8 mm, wherein a first line segment passing through an outermost projecting point of the bead core in the tire lateral direction and being parallel with a longest side of the bead core, a side of a bead base portion closer to a bead heel that is a portion of the bead portion that comes into contact with the specified rim, a curved line of a tire outer surface that is a portion of the bead portion that is located outward from the bead base portion in the tire lateral direction, a first intersection point of the side and the curved line, the second line segment passing through the first intersection point and being perpendicular to the first line segment, and the third line segment passing through the projecting point and being perpendicular to the first line segment are specified, and a ratio R2/R1 being from 0.935 to 0.975, wherein R2 is a tire radius at a bead toe of the bead base portion, and R1 is a tire radius at the bead heel.

In a pneumatic tire according to an embodiment of the present technology, a ratio R1/R3 is preferably from 0.985 to 0.995, wherein R3 is a tire radius at the bead core and R1 is the tire radius at the bead heel.

In a pneumatic tire according to an embodiment of the present technology, preferably the bead base portion includes an outer portion including the bead heel and an inner portion including the bead toe; and an angle of a side of the outer portion with respect to a line perpendicular to the tire equatorial plane is from 18° to 23°, and an angle of a side of the inner portion is from 27° to 33°.

In a pneumatic tire according to an embodiment of the present technology, an angle of the side of the bead base portion with respect to a line perpendicular to the tire equatorial plane is preferably from 15° to 20°.

The present technology provides a pneumatic tire that can suppress eccentric engagement of a bead portion on a rim wheel.

DETAILED DESCRIPTION

Embodiments of the present technology will be described with reference to the drawings. However, the present technology is not limited to those embodiments. Additionally, constituents described in the embodiments below can be combined, and one or more constituents can be omitted.

Herein, "tire lateral direction" refers to the direction that is parallel with a tire rotation axis of a pneumatic tire. "Inward in the tire lateral direction" refers to the direction toward a tire equatorial plane in the tire lateral direction. "Outward in the tire lateral direction" refers to the direction away from the tire equatorial plane in the tire lateral direction. Furthermore, "tire radial direction" refers to the direction orthogonal to the tire rotation axis. "Inward in the tire radial direction" refers to the direction toward the tire rotation axis in the tire radial direction. "Outward in the tire radial direction" refers to the direction away from the tire rotation axis in the tire radial direction. "Tire circumferential direction" refers to the direction of rotation about the tire rotation axis.

"Tire equatorial plane" refers to a plane orthogonal to the tire rotational axis that passes through the center in the tire lateral direction. "Tire equatorial line" refers to a centerline where the tire equatorial plane and the surface of a tread portion of the pneumatic tire meet.

Figure 1:
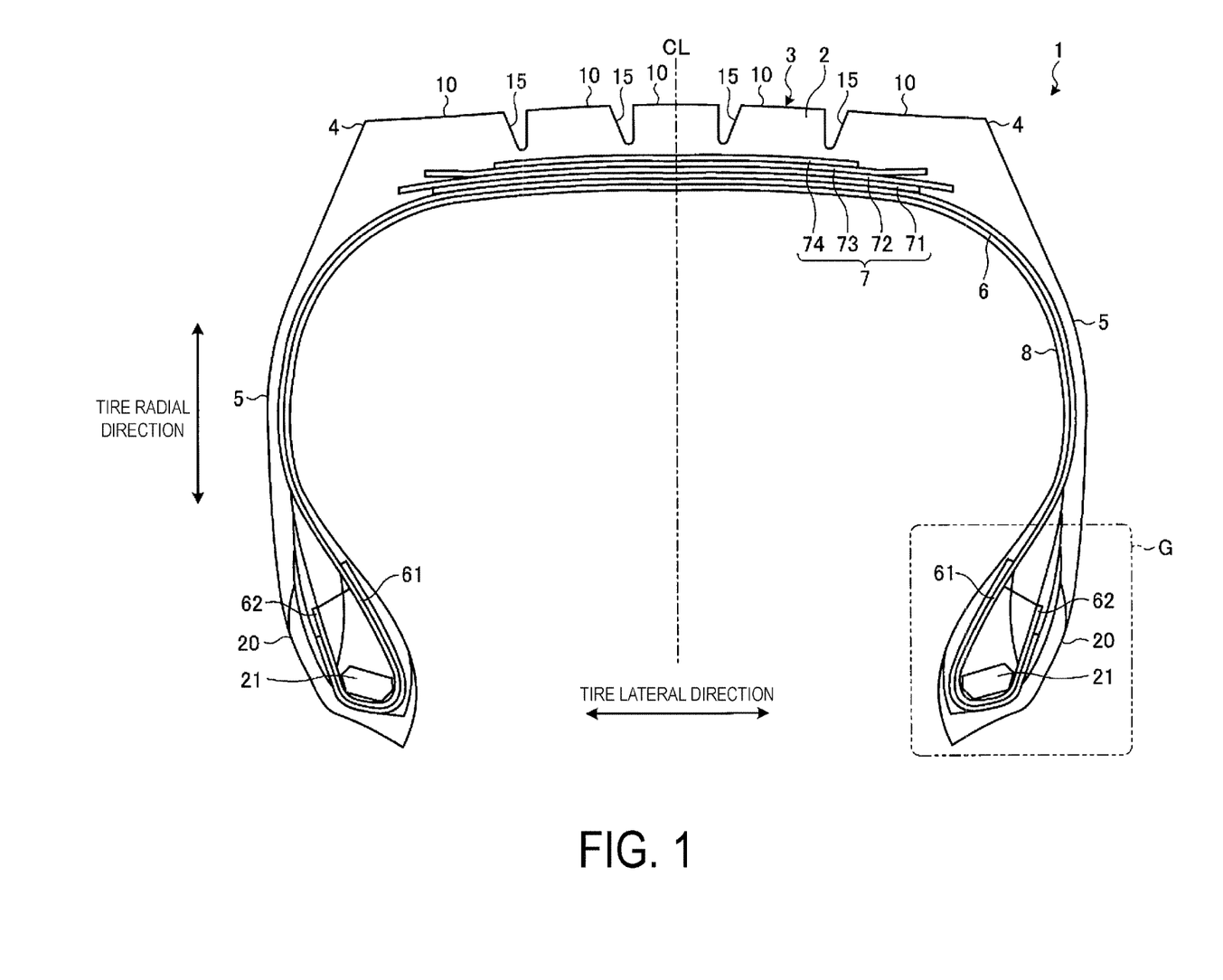
FIG. 1 is a meridian cross-sectional view illustrating a main portion of a pneumatic tire according to the present embodiment.

FIG. 1 is a meridian cross-sectional view illustrating a main portion of a tire 1 according to an embodiment. "Meridian cross-section" refers to a cross section that passes through the tire rotation axis. The tire 1 is a pneumatic tire and a tubeless tire. The tire 1 is a heavy duty tire mountable on a truck or bus. A tire (heavy duty tire) for a truck or bus refers to a tire specified in Chapter C of the JATMA Year Book (Standards of The Japan Automobile Tyre Manufacturers Association, Inc.) published by the Japan Automobile Tyre Manufacturers Association, Inc. (JATMA). Note that the tire 1 may be mountable on a passenger vehicle or may be mountable on a light truck.

The tire 1 illustrated in FIG. 1, as viewed in a meridian cross-section, is provided with a tread portion 2 in the outermost portion in the tire radial direction. The surface of the tread portion 2, i.e., the portion that comes into contact with the road surface when a vehicle mounted with the tire 1 travels, is formed as a tread surface 3. A plurality of circumferential main grooves 15 extending in the tire circumferential direction and a plurality of lug grooves (not illustrated) intersecting the circumferential main grooves 15 are formed in the tread surface 3. A plurality of land portions 10 are defined in the tread surface 3 by the circumferential main grooves 15 and the lug grooves. Note that the number of circumferential main grooves 15, the intervals between the lug grooves in the tire circumferential direction, the length and angle of the lug grooves, the groove width and the groove depth of each grooves, and the like are preferably set as appropriate. In other words, a tread pattern formed in the tread surface 3 is preferably set as appropriate.

Both ends of the tread portion 2 in the tire lateral direction are formed as shoulder portions 4. Sidewall portions 5 are disposed from the shoulder portions 4 to predetermined positions inward in the tire radial direction. In other words, the sidewall portions 5 are disposed at two positions on either side of the pneumatic tire 1 in the tire lateral direction.

Furthermore, a bead portion 20 is located inward of each sidewall portion 5 in the tire radial direction. The bead portions 20 are disposed at two positions on either side of a tire equatorial plane CL in a similar manner to that of the sidewall portions 5. In other words, the pair of bead portions 20 are disposed on either side of the tire equatorial plane CL in the tire lateral direction. The pair of bead portions 20 each include a bead core 21. The bead core 21 is formed by winding a bead wire, which is a steel wire, into an annular shape.

The bead portion 20 is configured to be mountable on a 15° tapered specified rim. Here, "specified rim" refers to an "applicable rim" defined by JATMA, a "Design Rim" defined by the Tire and Rim Association (TRA), or a "Measuring Rim" defined by the European Tyre and Rim Technical Organisation (ETRTO). In other words, the tire 1 according to the present embodiment can be mounted on the specified rim including an engaging portion for the bead portion 20 which is inclined with a 15° inclination angle with respect to the rotation axis.

A belt layer 7 is provided inward of the tread portion 2 in the tire radial direction. The belt layer 7, for example, has a multilayer structure including layered four belts 71, 72, 73, 74, the belts being made by a process of covering a plurality of belt cords made of steel or an organic fiber material, such as polyester, rayon, and nylon, and then a rolling process. Furthermore, the belts 71, 72, 73, 74 have different set of belt cords defined as inclination angles of the fiber direction of the belt cords with respect to the tire circumferential direction, and the belts are configured to be layered so that the fiber directions of the belt cords intersect each other, i.e., a crossply structure.

A carcass 6 including cords of radial ply is continuously provided inward of the belt layer 7 in the tire radial direction and along a side of the sidewall portion 5 closer to the tire equatorial plane CL. The carcass 6 is supported by the pair of bead cores 21. The carcass 6 has a single layer structure made of one carcass ply or a multilayer structure made of a plurality of carcass plies, and extends between the bead cores 21 disposed on either side in the tire lateral direction in a toroidal form, forming the framework of the tire. Specifically, the carcass 6 is disposed from one bead portion 20 to the other bead portion 20 wherein the set of the bead portions 20 is located on either side in the tire lateral direction, and turns back outward in the tire lateral direction along the bead cores 21 at the bead portions 20, wrapping around the bead cores 21. In other words, the carcass 6 is folded back around the bead cores 21 at the bead portions 20, so that the carcass 6 is disposed inward of the bead cores 21 in the tire lateral direction and runs inward of the bead core 21 in the tire radial direction and then outward of the bead core 21 in the tire lateral direction. The carcass ply of the carcass 6 disposed in this manner is made by a process of covering a plurality of carcass cords made of steel or an organic fiber material, such as aramid, nylon, polyester, and rayon, and then a rolling process.

Hereinafter, the carcass 6 that folds back at the bead core 21 located at the bead portion 20 includes a portion disposed inward from the bead core 21 in the tire lateral direction referred to as a carcass body portion 61, as appropriate, and a portion formed by the carcass 6 folding back at the bead core 21 disposed outward from the bead core 21 in the tire lateral direction referred to as a carcass folded back portion 62, as appropriate.

Additionally, an innerliner 8 is formed along the carcass 6 on the inner side of the carcass 6 or on the interior side of the tire 1 from the carcass 6.

Figure 2:
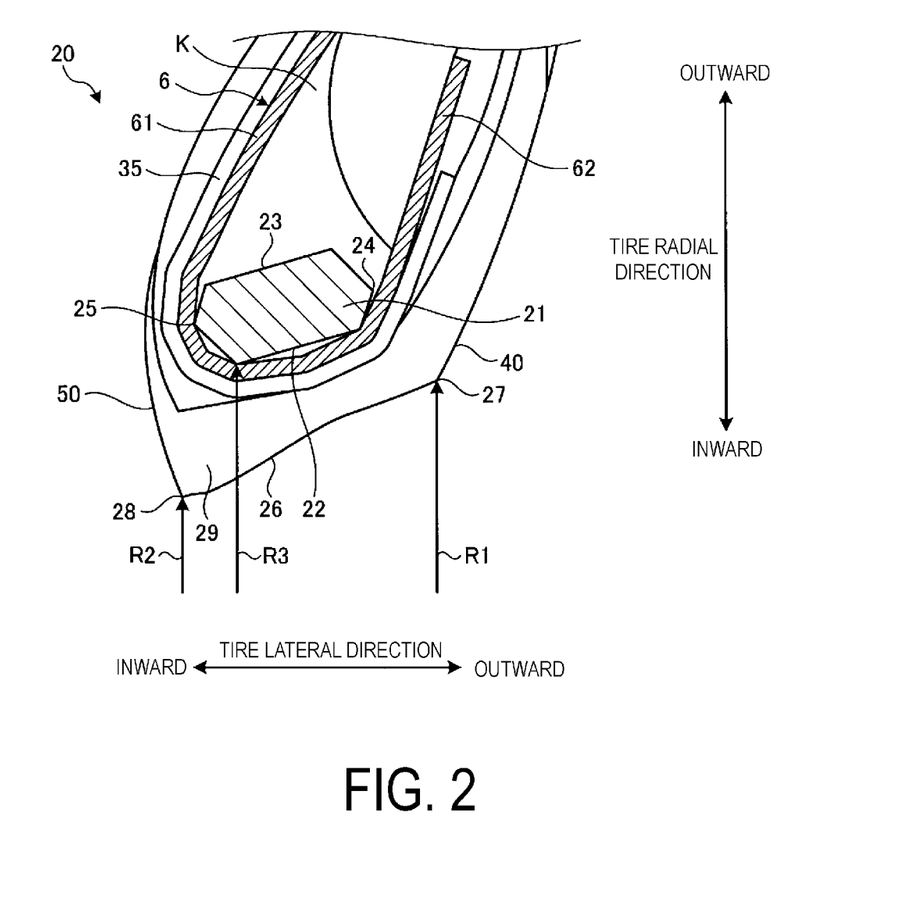
FIG. 2 is a detailed view of a portion G of FIG. 1.

FIG. 2 is a detailed view of a portion G of FIG. 1. A steel cord reinforcing layer 35 made of steel cords is disposed in a portion where the carcass 6 folds back around the bead core 21. The steel cord reinforcing layer 35 is disposed in contact with the outer surface of the carcass 6 folded back at the bead core 21 and reinforces the carcass 6. The steel cord reinforcing layer 35 is disposed layered on the carcass 6 on the outer side of the carcass 6 at the portion where the carcass 6 is folded back and, in a similar manner to that of the carcass 6, is folded back around the bead core 21 from in to out in the tire lateral direction and is disposed continuously in the tire circumferential direction. In other words, the steel cord reinforcing layer 35 is located inward of the carcass 6 in the tire lateral direction at the portion where the carcass 6 is located inward from the bead core 21 in the tire lateral direction, and is located outward of the carcass 6 in the tire lateral direction at the portion where the carcass 6 is located outward from the bead core 21 in the tire lateral direction.

Additionally, the bead core 21 formed by winding a bead wire into an annular shape has a shape when viewed in a meridian cross-section that is substantially hexagonal. Specifically, the bead core 21, when viewed overall, has a substantially hexagonal shape and includes an inner circumferential surface 22 and an outer circumferential surface 23, which have a substantially parallel orientation inclined inward in the tire radial direction as they run from outward to inward in the tire lateral direction, a corner portion 24 projecting outward in the tire lateral direction at an outer position in the tire lateral direction, and a corner portion 25 projecting inward in the tire lateral direction at an inner position in the tire lateral direction. Note that the inner circumferential surface 22 is a surface of the bead core 21 facing inward in the tire radial direction and the outer circumferential surface 23 is another surface of the bead core 21 facing outward in the tire radial direction.

In the present embodiment, among the six sides of the hexagonal shape of the bead core 21, when viewed in a meridian cross-section, the side specified as the outer circumferential surface 23 is the longest. Note that the side specified as the inner circumferential surface 22 may be the longest, or the side specified as the outer circumferential surface 23 and the side specified as the inner circumferential surface 22 may be equal in length.

In a similar manner, a bead base portion 26, which is the inner circumferential surface of the bead portion 20, inclines in a direction inward in the tire radial direction as it runs from outward to inward in the tire lateral direction. Note that the inner circumferential surface of the bead portion 20 is a surface of the bead portion 20 facing inward in the tire radial direction. In other words, at the bead base portion 26, a bead toe 28, which is an inner end portion of the bead base portion 26 in the tire lateral direction, is more inclined in a direction inward in the tire radial direction than a bead heel 27, which is an outer end portion of the bead base portion 26 in the tire lateral direction. The bead base portion 26 is provided as an engaging portion that engages and comes into contact with the specified rim when the tire 1 according to the present embodiment is mounted on the specified rim.

The bead base portion 26 includes a rim cushion rubber 29. The rim cushion rubber 29 is disposed inward of the bead core 21 and the carcass folded back portion 62 in the tire radial direction and outward thereof in the tire lateral direction. The rim cushion rubber 29 is a rubber layer that composes the contact surface that contacts a specified rim. The bead base portion 26 is made of the rim cushion rubber 29.

In the bead portion 20, a tire outer surface 40 is formed to be curved projecting outward in the tire lateral direction. In other words, the portion of the tire outer surface 40 at the bead portion 20, the outer surface 40 being a surface on the side of the tire 1 exposed to the outside air, is curved projecting outward in the tire lateral direction. The bead heel 27, i.e., one end portion of the bead base portion 26, is the intersection point between the tire outer surface 40 and the bead base portion 26.

In the bead portion 20, a tire inner surface 50 is formed to be curved projecting inward in the tire lateral direction. In other words, the portion of the tire inner surface 50 at the bead portion 20, the inner surface 50 being a surface on the side of the tire 1 filled with air, is curved projecting inward in the tire lateral direction. The bead toe 28, i.e., the other end portion of the bead base portion 26, is the intersection point between the tire inner surface 50 and the bead base portion 26.

Additionally, the bead portion 20 is provided with a bead rubber layer K. At least a portion of the bead rubber layer K is disposed between the carcass body portion 61 and the carcass folded back portion 62. The bead rubber layer K is also known as a bead filler.

Figure 3:
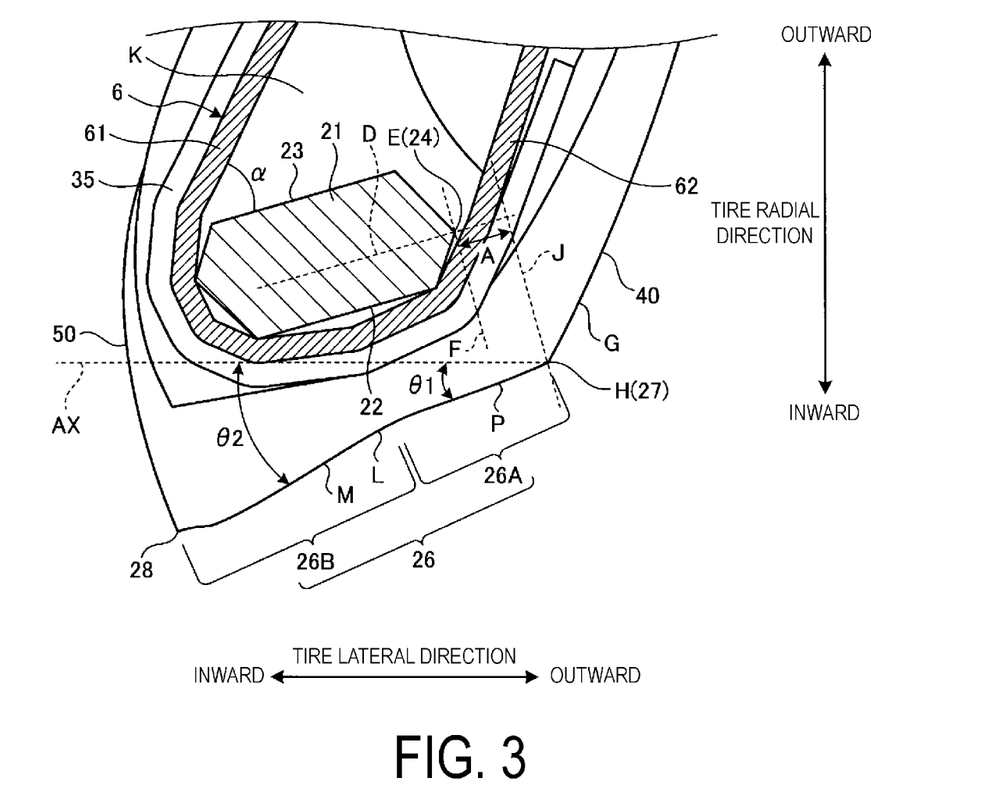
FIG. 3 is an enlarged view of a portion of FIG. 2.

FIG. 3 is an enlarged view of a portion of FIG. 2. Specified values such as respective dimensions of constituents of the bead portion 20 according to the present embodiment will be described below with reference to FIGS. 2 and 3. The specified values described below are specified values when the tire 1 is not mounted on the specified rim. In other words, the specified values are specified values of the tire 1 in a state prior to being mounted on the specified rim and are specified values in a meridian cross-section of the tire 1 after vulcanization molding via a mold. For the sake of convenience, the specified values are in a meridian cross-section of the tire 1 set by the linear distance between imaginary intersection points H (the distance between the imaginary intersection points H of the pair of bead portions 20) described below when the tire is stood up by itself.

As illustrated in FIG. 3, in a meridian cross-section of the bead portion 20, a first line segment D passing through an outermost projecting point E of the bead core 21 in the tire lateral direction and being parallel with the longest side of the bead core 21, a side P of the bead base portion 26 closer to the bead heel 27 wherein the side P that is a portion of the bead portion 20 is configured to contact with the specified rim, a curved line G of the tire outer surface 40 wherein the curved line G that is a portion of the bead portion 20 is located outward from the bead base portion 26 in the tire lateral direction, a first intersection point H of the side P and the curved line G, a second line segment J passing through the first intersection point H and being perpendicular to the first line segment D, and a third line segment F passing through the projecting point E and being perpendicular to the first line segment D are specified.

The projecting point E includes the corner portion 24. The projecting point E, in a meridian cross-section, is a point where the first line segment D running through the center of the outermost bead wire in the tire lateral direction of the bead wires of the bead core 21 and being parallel with the longest side of the bead core 21 meets the profile of the bead wires. The longest side is specified by the outer circumferential surface 23. The first intersection point H includes the bead heel 27.

In the present embodiment, a distance A between the second line segment J and the third line segment F is from 4 mm to 8 mm.

Additionally, in the present embodiment, the bead base portion 26 includes an outer portion 26A that includes the bead heel 27 and an inner portion 26B that includes the bead toe 28. The side of the outer portion 26A in the meridian cross-section is the side P. The side of the inner portion 26B in the meridian cross-section is a side M.

The side P and the side M are connected via an inflection point L. In other words, the side P and the side M each have different angles with respect to the tire rotation axis, and the side P and the side M bend at the inflection point L. The inflection point L is located from 8 mm to 18 mm from the first intersection point H in the tire lateral direction.

An angle $\theta 1$ of the side P of the outer portion 26A with respect to a line AX perpendicular to the tire equatorial plane CL (that is a line AX is parallel with the tire rotation axis) is from 18° to 23°, and an angle $\theta 2$ of the side M of the inner portion 26B with respect to the line AX is from 27° to 33°.

As illustrated in FIG. 2, a tire radius R2 at the bead toe 28 and a tire radius R1 at the bead heel 27, of the bead base portion 26, have a ratio R2/R1 ranging from 0.935 to 0.975. The tire radius R1 is the distance in the tire radial direction from the tire rotation axis to the bead heel 27. The tire radius R2 is the distance in the tire radial direction from the tire rotation axis to the bead toe 28.

Additionally, a tire radius R3 at the bead core 21 and the tire radius R1 at the bead heel 27 have a ratio R1/R3 ranging from 0.985 to 0.995. "Tire radius R3" at the bead core 21 is, in a meridian cross-section, the distance in the tire radial direction from the innermost vertex in the tire radial direction of the vertexes (six in the present embodiment) of the polygonal (hexagonal in the present embodiment) bead core 21 to the tire rotation axis.

As described above, according to the present embodiment, the distance A is from 4 mm to 8 mm. This allows an angle $\alpha$ (see FIG. 3) formed by the carcass body portion 61 and the outer circumferential surface 23 of the bead core 21 to be decreased. In other words, by the distance A being from 4 mm to 8 mm, the position of the bead core 21 is shifted inward in the tire lateral direction. As a result, in the tire 1 before and after being inflated with air, the amount of change in position of the carcass 6 located near the bead portion 20 is reduced. Additionally, the ratio between the tire radius R2 at the bead toe 28 and the tire radius R1 at the bead heel 27 can be made appropriate, and thus eccentric engagement after inflation can be suppressed.

When the distance A is greater than 8 mm, the volume of the bead rubber layer K increases to a level which deteriorates heat build-up and the durability of the bead portion 20. When the distance A is less than 4 mm, the angle α cannot be made sufficiently small, and eccentric engagement is made difficult to effectively suppress. Thus, the distance A is preferably from 4 mm to 8 mm, and more preferably from 5 mm to 7 mm.

In the present embodiment, the ratio R2/R1 is from 0.935 to 0.975. When the ratio R2/R1 is less than 0.935, the rim mounting workability of tire 1 is degraded. When the ratio R2/R1 is greater than 0.975, the likelihood of eccentric engagement is high. Thus, the ratio R2/R1 is preferably from 0.935 to 0.975.

Additionally, in the present embodiment, the tire radius R3 at the bead core 21 and the tire radius R1 at the bead heel 27 have the ratio R1/R3 ranging from 0.985 to 0.995. This can further suppress eccentric engagement. When the ratio R1/R3 is less than 0.985, an effect of remedying eccentric engagement is not sufficiently obtained. When the ratio R1/R3 is greater than 0.995, rim mounting workability is degraded. Thus, the ratio R1/R3 is preferably from 0.985 to 0.995.

In the present embodiment, the bead base portion 26 has a two-step tapered structure including the side P and the side M that bend at the inflection point L. The angle θ1 of the side P of the outer portion 26A is from 18° to 23°. The angle θ2 of the side M of the inner portion 26B is from 27° to 33°. When the angle θ1 is less than 18° and the angle θ2 is less than 27°, an effect of remedying eccentric engagement is not sufficiently obtained. When the angle θ1 is greater than 23° and the angle θ2 is greater than 33°, rim mounting workability is degraded. Thus, the angle θ1 is preferably from 18° to 23° and the angle θ2 is preferably from 27° to 33°.

Figure 4:
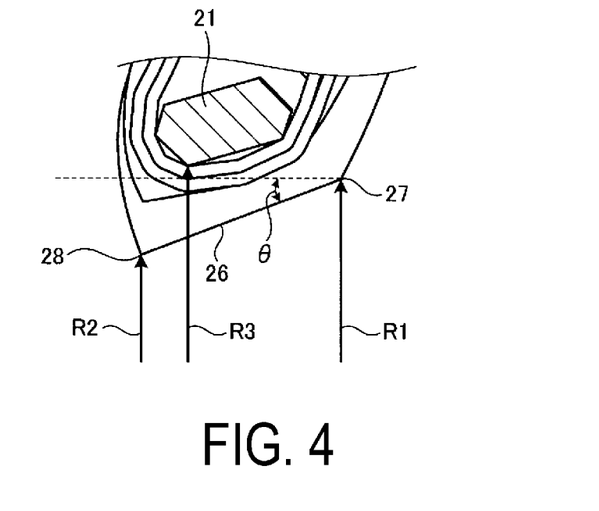
FIG. 4 is a meridian cross-sectional view illustrating a pneumatic tire according to a modified example of the present embodiment.

Note that in the present embodiment, the bead base portion 26 has a two-step tapered structure. As illustrated in FIG. 4, the bead base portion 26 may has a single tapered structure. The bead base portion 26 illustrated in FIG. 4 does not include the inflection point L, and the side of the bead base portion 26 in a meridian cross-section is linear. In such a configuration, to suppress eccentric engagement, an angle θ of the side of the bead base portion 26 with respect to the line AX perpendicular to the tire equatorial plane CL is preferably from 15° to 20°. When the angle θ is less than 15°, an effect of remedying eccentric engagement is not sufficiently obtained. When the angle θ is greater than 20°, rim mounting workability is degraded. Thus, the angle θ is preferably from 15° to 20°.

EXAMPLES

FIGS. 5 to 8 are tables showing results of performance tests of tires 1. In relation to the tires 1 described above, performance evaluation tests conducted on tires 1 of a conventional example and comparative examples and the tires 1 according to embodiments of the present technology will be described below. The performance evaluation tests were conducted for eccentric engagement, which indicates the degree with which a bead portion is eccentrically engaged with a rim wheel, and rim mounting workability, which indicates the ease with which a tire 1 can be mounted on a rim.

As indicated in FIGS. 5 to 8, the evaluation test was conducted on the tire 1 of Conventional Example, the tires 1 of Comparative Examples 1 to 4, and the tires 1 of Examples 1 to 16, which are embodiments of the present technology.

In the performance evaluation test for eccentric engagement, the tires 1 with a size of 11R22.5 were mounted on "22.5×7.50" rim wheels and inflated to the specified maximum air pressure (700 kPa). The distance from the rim flange to the circumferential vent was measured at 8 positions around the circumference on one side, and the range around one tire was compared and evaluated. Small ranges indicate superior eccentric engagement, meaning the degree of eccentric engagement is small. The eccentric engagement values shown represent a maximum value of the distance measurements.

In the evaluation test for rim mounting workability, the tires 1 with a size of 11R22.5 were mounted manually on "22.5×7.50" rim wheels using two levers. The time spent and the ease of mounting were evaluated. For the evaluation of rim mounting workability, the results are expressed as index values and evaluated. Larger values indicate superior rim mounting workability.

Figure 5:
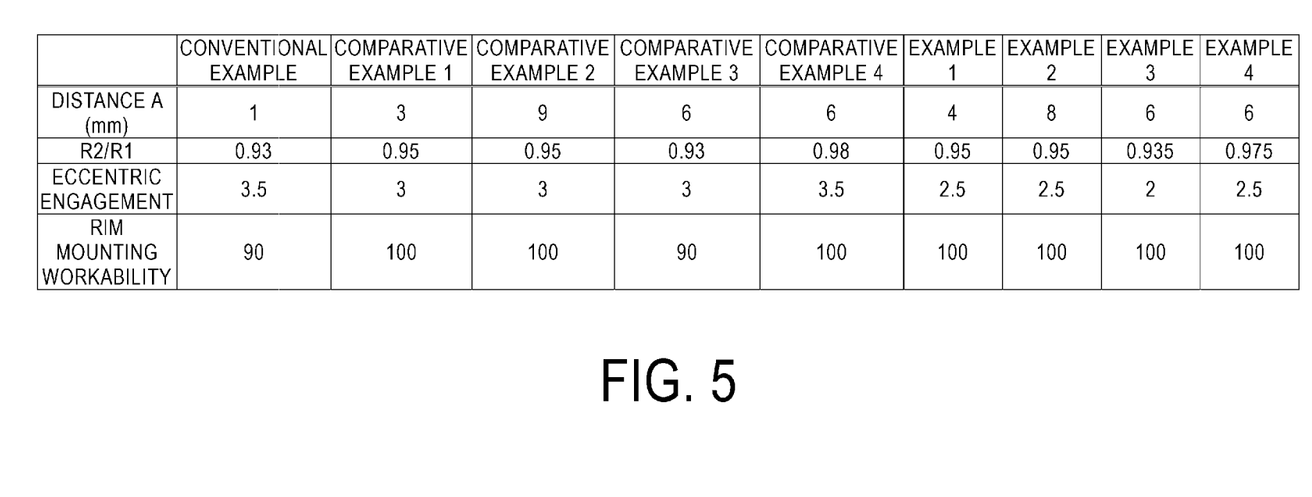
FIG. 5 is a table showing results of performance tests of pneumatic tires according to the present embodiments.

As indicated in FIG. 5, in the tire 1 of Conventional Example, the distance A and the ratio R2/R1 are outside the technical scope of the present technology. The tires 1 of Comparative Examples 1 to 4 all have a constituent outside the technical scope of the present technology.

As shown in FIG. 5, the tires 1 of Examples 1 to 4 have superior eccentric engagement compared to the tires 1 of Conventional Example and Comparative Examples. In other words, for the tires 1 of Examples 1 to 4, the bead portions are engaged with the rim wheels with correct positioning, and the likelihood of uneven wear reduced.

Figure 6:
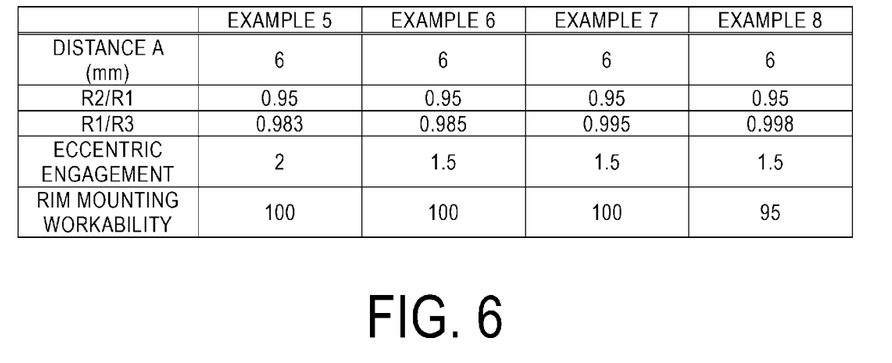
FIG. 6 is a table showing results of performance tests of pneumatic tires according to the present embodiments.

As indicated in FIG. 6, the ratio R1/R3 was varied for the tires of Examples 5 to 8. When the value of the ratio R1/R3 is from 0.985 to 0.995, eccentric engagement and rim mounting workability are even more superior.

Figure 7:
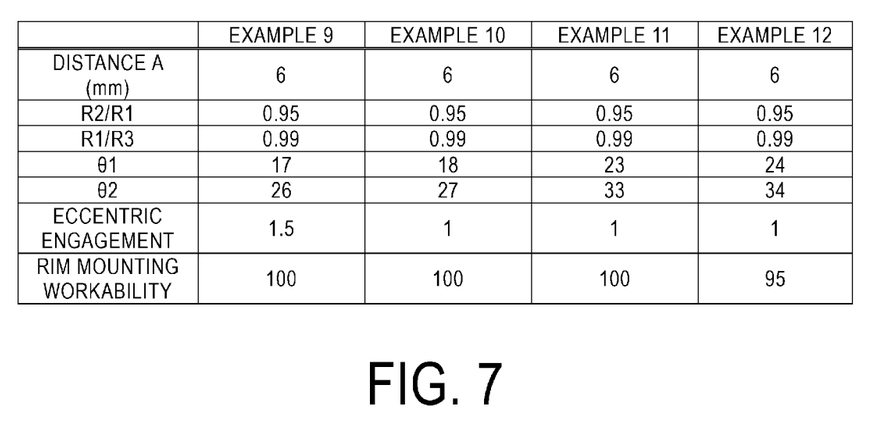
FIG. 7 is a table showing results of performance tests of pneumatic tires according to the present embodiments.

As indicated in FIG. 7, the values of the angles θ1, θ2 were varied for the two-step tapered structure of the bead base portion 26. As indicated by Examples 9 to 12, when the angle θ1 is from 18° to 23°, and the angle θ2 is from 27° to 33°, eccentric engagement and rim mounting workability are even more superior.

Figure 8:
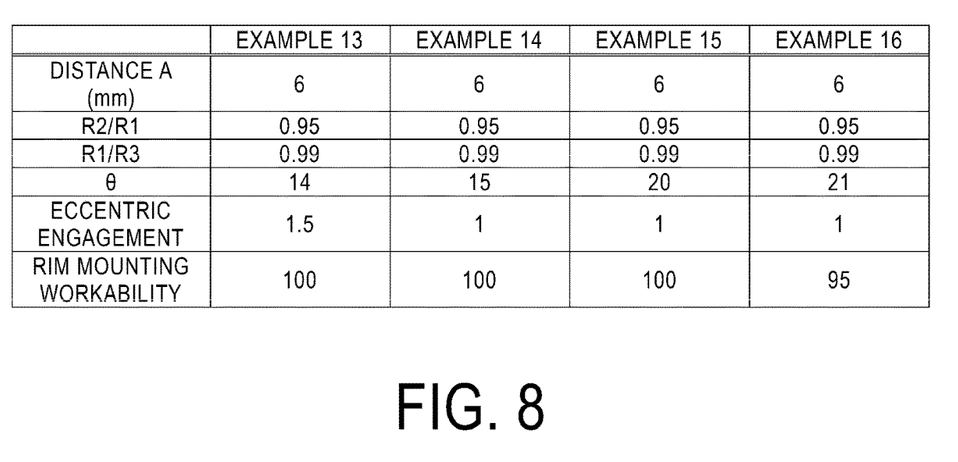
FIG. 8 is a table showing results of performance tests of pneumatic tires according to the present embodiments.

As indicated in FIG. 8, the value of the angle θ was varied for the single tapered structure of the bead base portion 26. As indicated by Examples 13 to 16, when the angle θ is from 15° to 20°, eccentric engagement and rim mounting workability are even more superior.

The invention claimed is:

1. A pneumatic tire mountable on a 15° tapered specified rim, the pneumatic tire comprising:
   a pair of bead portions disposed on either side of a tire equatorial plane in a tire lateral direction;
   a bead core provided in each of the pair of bead portions, the bead core having a hexagonal shape when viewed in a meridian cross-section;
   a carcass supported by the bead core provided in each of the pair of bead portions, the carcass comprising a carcass body portion and a carcass folded back portion formed by the carcass folding back at the bead core;
   a steel cord reinforcing layer disposed on an outer surface of the carcass folded back at the bead core; and
   a bead rubber layer with at least a portion thereof disposed between the carcass body portion and the carcass folded back portion;

when the pneumatic tire is not mounted on the specified rim, a distance from a second line segment to a third line segment being from 4 mm to 8 mm, wherein a first line segment passing through an outermost projecting point of the bead core in the tire lateral direction and being parallel with a longest side of the bead core, a side of a bead base portion closer to a bead heel that is a portion of the bead portion that comes into contact with the specified rim, a curved line of a tire outer surface that is a portion of the bead portion that is located outward from the bead base portion in the tire lateral direction, a first intersection point of the side and the curved line, the second line segment passing through the first intersection point and being perpendicular to the first line segment, and the third line segment passing through the outermost projecting point and being perpendicular to the first line segment are specified, a ratio R2/R1 being from 0.935 to 0.975, wherein R2 is a tire radius at a bead toe of the bead base portion, and R1 is a tire radius at the bead heel, and a ratio R1/R3 is from 0.985 to 0.995, wherein R3 is a tire radius at the bead core and R1 is the tire radius at the bead heel, wherein the bead base portion comprises an outer portion comprising the bead heel and an inner portion comprising the bead toe, and an angle of a side of the outer portion with respect to a line perpendicular to the tire equatorial plane is from 18° to 23°, an angle of a side of the inner portion being from 27° to 33°.

* * * * *